United States Patent [19]

Harris

[11] Patent Number: 5,199,131
[45] Date of Patent: Apr. 6, 1993

[54] THERMOPLASTIC CASTER ASSEMBLY

[75] Inventor: Charles A. Harris, Evansville, Ind.

[73] Assignee: Babcock Industries, Inc., Fairfield, Conn.

[21] Appl. No.: 721,318

[22] Filed: Jun. 26, 1991

[51] Int. Cl.$^5$ .......................................... B60B 33/00
[52] U.S. Cl. .......................................... 16/21; 16/20; 16/31 R
[58] Field of Search ................ 16/20, 21, 31 A, 31 R, 16/22, 23, 18 R

[56] References Cited

U.S. PATENT DOCUMENTS

| | | | |
|---|---|---|---|
| 2,500,886 | 3/1950 | Torkelson | 16/21 |
| 4,097,954 | 7/1978 | Christensen | 16/21 |
| 4,348,784 | 9/1982 | Fontana | 16/21 |
| 4,494,271 | 1/1985 | Perlin et al. | 16/21 |
| 4,653,139 | 3/1987 | Vollberg et al. | 16/20 |
| 4,707,880 | 11/1987 | Doyle et al. | 16/21 |

FOREIGN PATENT DOCUMENTS

| | | | |
|---|---|---|---|
| 2233356 | 1/1974 | Fed. Rep. of Germany | 16/20 |
| 2800095 | 7/1979 | Fed. Rep. of Germany | 16/21 |
| 3512406 | 10/1985 | Fed. Rep. of Germany | 16/20 |
| 0016902 | 1/1983 | Japan | 16/31 R |
| 2090126 | 7/1982 | United Kingdom | 16/20 |

Primary Examiner—David Jones
Attorney, Agent, or Firm—Woodard, Emhardt, Naughton Moriarty & McNett

[57] ABSTRACT

A caster assembly has a stem and ball bearing retainer made of a single homogeneous unit of reinforced plastic, a horn made of a single piece of reinforced plastic, a bottom bearing retainer made of a single piece of reinforced plastic, an upper set of ball bearings between the horn and the upper retainer, a lower set of ball bearings between the horn and the bottom retainer, with the bottom retainer being ultrasonically welded to the unitary stem and retainer.

9 Claims, 3 Drawing Sheets

THERMOPLASTIC CASTER ASSEMBLY

BACKGROUND OF THE INVENTION

1. Field of the Invention

This invention relates generally to casters for supporting carts or the like, and more particularly to a caster assembly made of non-metallic materials.

2. Description of the Prior Art

A great variety of caster assemblies has been invented and marketed. To the best of my knowledge, most of such products have been made of metal, typically steel. There is a need for caster assemblies in environments which are detrimental to metallic products. Plastics are often considered in various industries where immunity to certain chemical attacks is desired. I am not aware of any suitable adaptations of plastics to caster assemblies. My invention is addressed to providing a caster assembly of material relatively immune to chemical attack but sturdy enough to perform the usual functions expected of caster assemblies.

SUMMARY OF THE INVENTION

According to a typical embodiment of the present invention, a caster assembly is constructed of a stem and ball bearing retainer combination unit made of a single homogeneous piece of reinforced plastic, a horn made of a single piece of reinforced plastic, a bottom bearing retainer made of a single piece of reinforced plastic, an upper set of ball bearings between the horn and the upper retainer, and a lower set of ball bearings between the horn and the bottom retainer, with the bottom retainer being ultrasonically welded to the stem and retainer combination unit.

DESCRIPTION OF THE PREFERRED EMBODIMENT

Figure 1:
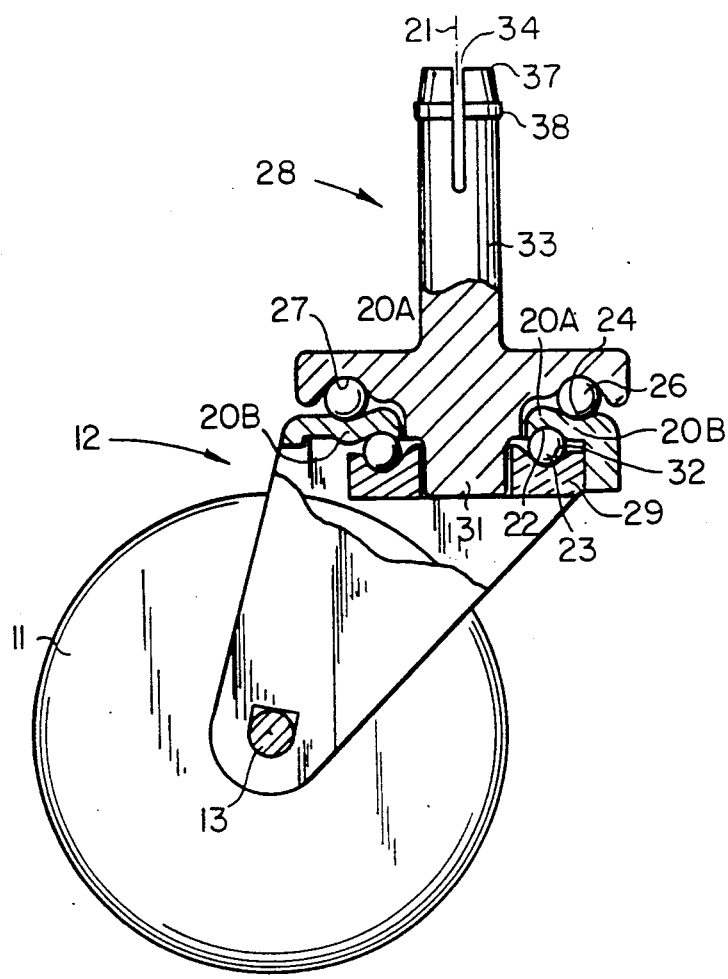
FIG. 1 is a side elevational view of a caster assembly according to a typical embodiment of the present invention, with portions broken away to show interior details at the swivel axis.
Figure 2:
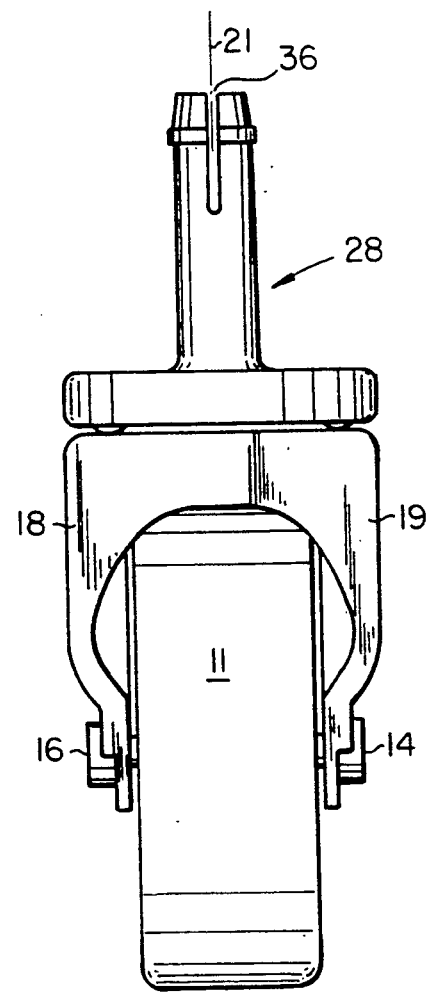
FIG. 2 is a front elevational view thereof.
Figure 3:
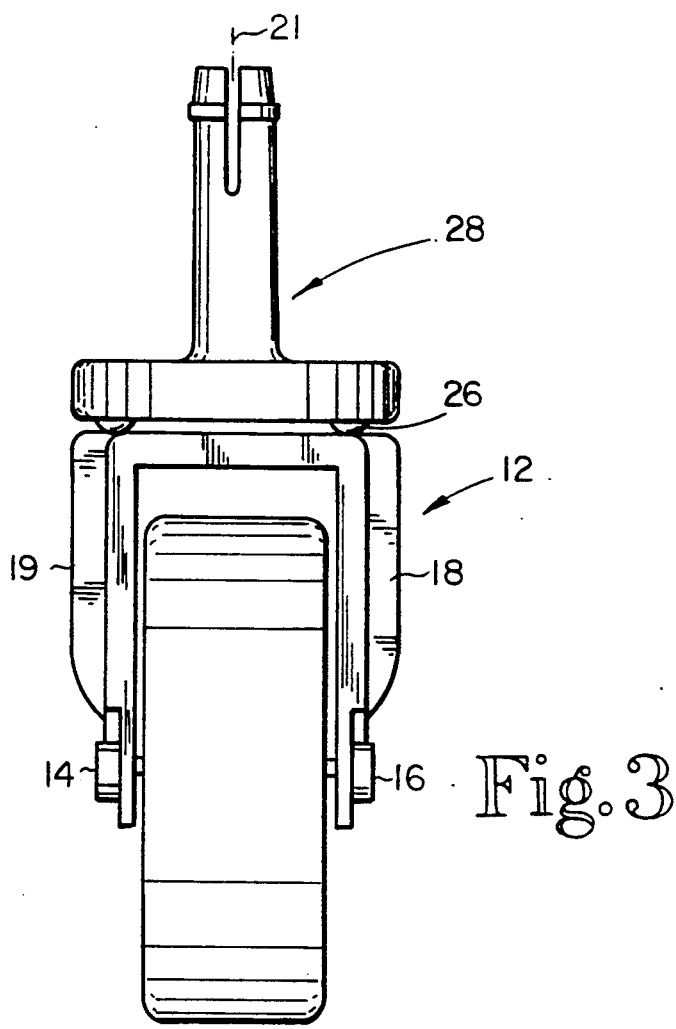
FIG. 3 is a rear elevational view thereof.
Figure 4:
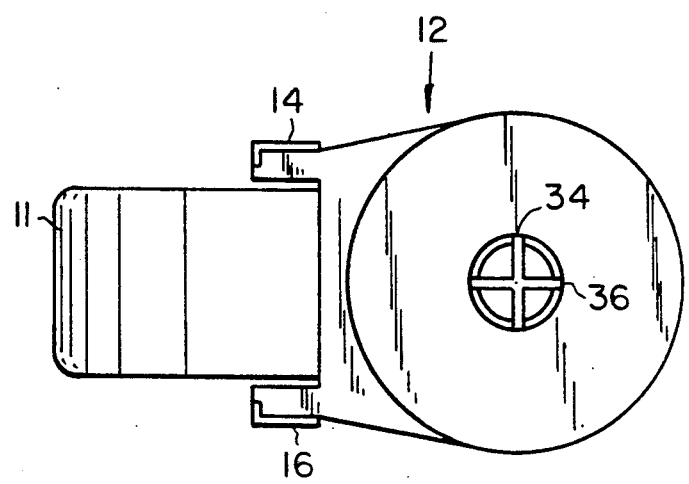
FIG. 4 is a top plan view thereof.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the caster assembly includes a wheel 11 mounted to a horn 12 by means of an axle 13 which may have a head 14 at one end and a push-on nut or other head 16 at the other end. The horn 12 includes a top bridge portion 17 bridging the space between the two side legs 18 and 19 of the horn. This bridge has two concentric concavo-convex ring portions 20A and 20B formed immediately adjacent each other, with the concave face of inner ring 20A facing down, and the concave face of outer ring 20B facing up. These rings, being the inner races and outer races of swivel bearings, establish the caster swivel axis 21. The downwardly facing concave groove 22 of ring 20A on the underside of the horn bridge receives bearings 23. The convex surface of the bridge immediately above this groove is the inner margin of the concave groove 24 of ring 20B in the upper face of the horn bridge portion. This receives ball bearings 26 which are received in the downwardly facing concave surface of the circular groove 27 of the stem and retainer unit 28. This groove is centered on the swivel axis 21. A bottom retainer 29 is received on the bottom stem 31 of the stem and retainer unit 28 and has an upwardly facing circular concave groove 32 receiving the bearings 23 therein.

The top stem 33 of the stem and retainer unit 28 has diametrically extending slots 34 and 36 which cross on the axis, providing four prongs tapering from an upper end 37 outwardly and downward to a skirt 38 extending to a slightly greater diameter than the diameter of the top stem itself 33, to provide a spring gripping action when received in a caster receiving hole in the bottom of a cart or the like to be supported by the caster assembly.

It is one of the features of this invention that the caster stem and retainer unit 28 is made of one piece of molded plastic. The material is preferably 40% glass-filled nylon. Another feature is that the bottom retainer is also of reinforced molded plastic. An example is 30% glass-filled nylon. Similarly, the horn is made of one piece of molded plastic such as 30% glass-filled nylon. A further feature is that the bottom retainer is ultrasonically welded together with the stem and retainer, the diameter of the bottom stem being 0.435-0.445 inches, for example, and the diameter of the central aperture of the bottom retainer being 0.451-0.446 inches diameter, for example.

Figure 6:
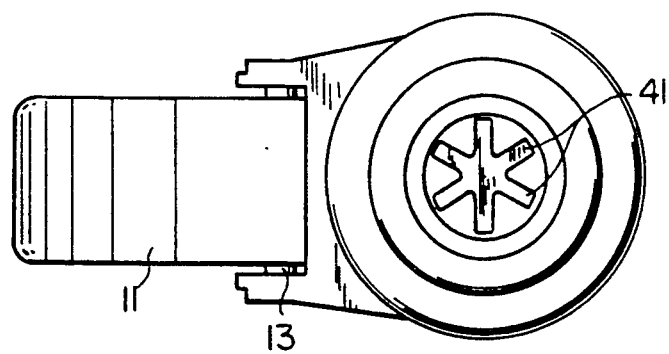
FIG. 6 is a top plan view of the second embodiment.
Figure 5:
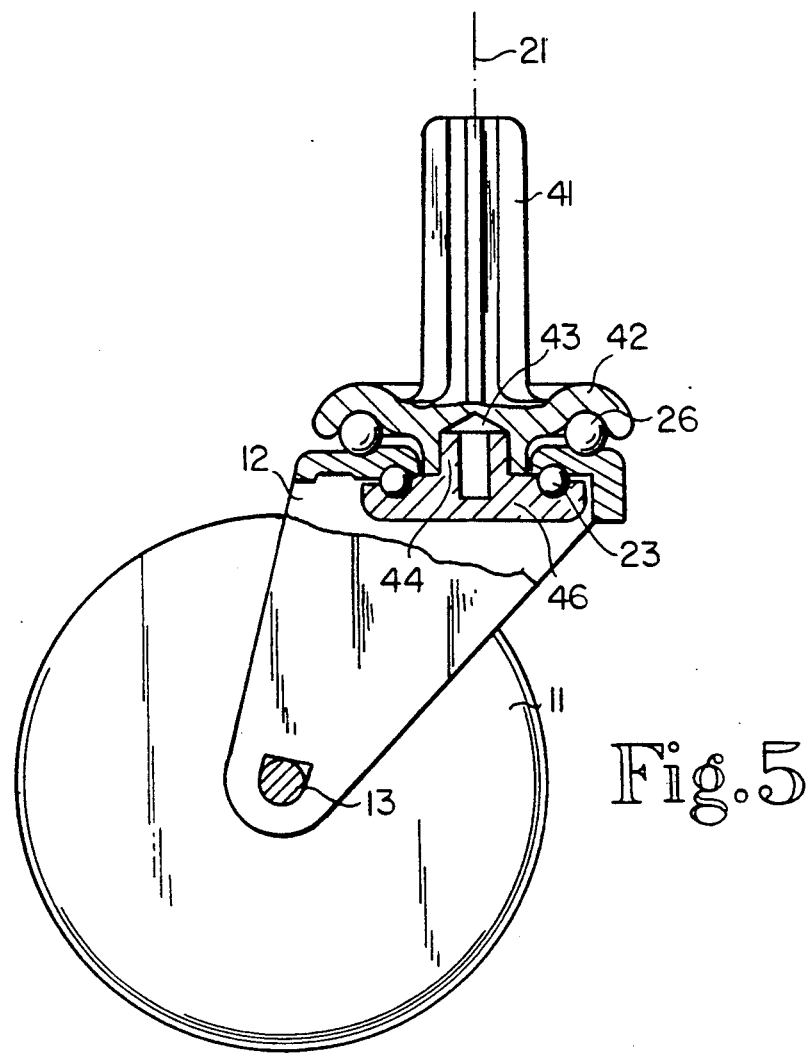
FIG. 5 is a side elevational view of a second embodiment with portions broken away to show interior details at the swivel axis.

FIGS. 5 and 6 show a second and preferred embodiment of the stem and retainer unit and lower retainer. In this embodiment, the features are essentially the same as in the first embodiment except that the stem and retainer construction and assembly is slightly different. The portions which are identical are given the same reference numerals as in FIGS. 1 through 4. In this embodiment, the stem retainer unit 39 includes six axially extending flutes 41, each of them being on a radius from the swivel axis 21 and extending up from the retainer portion 42 to the upper end of the stem. According to another feature of this embodiment, the retainer portion 42 has a centrally located and downwardly opening circular hole 43 which receives the upwardly projecting boss 44 of the bottom retainer 46. This central boss 44 is ultrasonically welded to the retainer in the hole 43 around the entire circumference of this boss to thereby secure the bottom retainer 46 to the top retainer portion 42.

The materials for the stem and retainer unit 39 and the bottom retainer unit 46 of this embodiment may be the same as mentioned above with reference to the first embodiment.

In both embodiments, the bearings 23 and 26 are placed in a complete series in each of the respective bearing races provided by the aforementioned grooves molded into the respective parts around the central axis 21 and are in place when the ultrasonic welding is done.

These bearings may be a corrosion resistant stainless steel, or a reinforced plastic such as made by the Hoover Bearing Company under the trade name "Torlon". Although the mentioned materials are glass-filled nylon for the major components, other plastic materials may be used in the practice of this invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A caster assembly comprising:
    a stem and upper ball bearing retainer combination unit made of a single homogeneous piece of plastic and having a central longitudinal swivel axis;
    a horn;
    a bottom bearing retainer made of a single piece of reinforced plastic;
    an upper set of ball bearings spaced in a first circle about the axis and located between the horn and the upper retainer; and
    a lower set of ball bearings spaced in a second circle about the axis and located between the horn and the bottom retainer, with the bottom retainer being fused to the stem and retainer combination unit.

2. The caster assembly of claim 1 and wherein:
    The upper ball bearing retainer combination unit has the upper set of ball bearings centered on the axis, the unit having a centrally located downwardly opening hole in a bottom surface thereof and centered on the axis with the bearings in the first circle located outboard of the hole; and
    the bottom retainer has a centrally located upwardly projecting boss thereon received in the downwardly opening hole in the combination unit.

3. The caster assembly of claim 2 and wherein:
    the fusion of the bottom retainer to the combination unit is at an interface between an inner cylindrical surface of the hole in the combination unit, and an outer cylindrical surface of the boss in the bottom retainer.

4. The caster assembly of claim 1 and wherein:
    the horn is made of a single piece of reinforced plastic.

5. The caster assembly of claim 4 and wherein: all of the ball bearings between the horn and upper retainer are made of plastic.

6. The caster assembly of claim 4 and further comprising:
    a wheel mounted in the horn and supporting the caster assembly.

7. The caster assembly of claim 4 and wherein:
    the bottom bearing retainer is attached to the combination unit by an ultrasonic weld.

8. A method of making a caster assembly having a mounting stem unit, a horn with two side legs and a top bridge portion, a bottom bearing retainer, and a first set of bearings between the bridge portion of the horn and the mounting stem unit, and a second set of bearings between the bridge portion and the retainer, the method comprising the steps of:
    placing ball bearings between the bridge portion of the horn and the stem unit on top of the bridge portion to comprise the first set, and placing ball bearings between the bottom bearing retainer and the bottom of the bridge portion to comprise the second set; and
    fusing the bottom bearing retainer on the bottom of the stem unit while holding the bearings in place in a bearing race groove in the stem unit and in a bearing race groove in the bottom bearing retainer.

9. A method of making a caster assembly having a mounting stem unit, a horn with two side legs and a top bridge portion, a bottom bearing retainer, and a first set of bearings between the bridge portion of the horn and the mounting stem unit, and a second set of bearings between the bridge portion and the retainer, the method comprising the steps of:
    placing ball bearings between the bridge portion of the horn and the stem unit on top of the bridge portion to comprise the first set, and placing ball bearings between the bottom bearing retainer and the bottom of the bridge portion to comprise the second set; and
    fusing the bottom bearing retainer on the bottom of the stem unit while holding the bearings in place in a bearing race groove in the stem unit and in a bearing race groove in the bottom bearing retainer;
    the fusing step comprising ultrasonically welding the bottom retainer to the stem unit.

* * * * *